United States Patent [19]

German et al.

[11] Patent Number: 4,566,336

[45] Date of Patent: Jan. 28, 1986

[54] NAVIGATIONAL AID ALERTING SYSTEM

[75] Inventors: John G. German, Mont St. Hilaire; Abraham Benjamin, Montreal; James F. Stirling, Dorval, all of Canada

[73] Assignee: Canadian Patents & Development Ltd. Sociéte Canadienne Des Brevets et D'Exploitatio Limited, Ottawa, Canada

[21] Appl. No.: 508,458

[22] Filed: Jun. 27, 1983

[51] Int. Cl.⁴ ............................................. G01B 7/16
[52] U.S. Cl. ................................. 73/772; 340/870.13
[58] Field of Search ........................ 73/763, 760, 772; 364/508, 556, 134; 340/518, 870.11, 665, 870.13; 360/39

[56] References Cited

U.S. PATENT DOCUMENTS

| | | |
|---|---|---|
| 1,057,807 | 4/1913 | Day. |
| 3,354,703 | 11/1967 | Russell, Jr. et al. |
| 3,525,075 | 8/1970 | Frome et al. ............... 340/870.11 X |
| 3,671,954 | 6/1972 | Clay ................................ 340/240 |
| 3,935,592 | 1/1976 | Dahlen et al. ................... 360/39 X |
| 4,118,771 | 10/1978 | Pomella et al. ..................... 364/134 |
| 4,216,462 | 8/1980 | McGrath et al. ........... 340/870.11 X |
| 4,422,336 | 12/1983 | Beebe ................................. 73/769 |
| 4,432,234 | 2/1984 | Jones ............................. 73/772 X |

FOREIGN PATENT DOCUMENTS 2094476 9/1982 United Kingdom ............... 340/665

Primary Examiner—Jerry W. Myracle
Attorney, Agent, or Firm—John A. Baker

[57] ABSTRACT

The present invention relates to a device for scanning a plurality of sensor units. The device is comprised of at least one remote data acquisition unit which sequentially scans a plurality of sensor units and which stores data corresponding to the stress measured and the location of the sensor unit measuring the stress. A master control unit is provided for receiving address and stress data from the at least one remote data acquisition unit and comparing the magnitude of the stress with respect to predetermined stress values. A display unit is provided which illustrates the relative magnitude of stress measured with the above mentioned predetermined stress values.

10 Claims, 3 Drawing Figures

— Red Array
— Yellow Array

NAVIGATIONAL AID ALERTING SYSTEM

The invention relates to a navigational aid system for ships and, in particular, a warning system for ships travelling in ice conditions. Ships operating under Arctic conditions involved in the ice breaking process are especially adapted for this function. In most cases, such ships have reinforced hulls to withstand impacts and are shaped differently from regular ships plying open water routes. The navigation of ships is a specialized skill demanding precise judgement on the part of the ship's navigating officers. Thus, in addition to regular sea navigation duties, officers in command of ice breaking ships must also familiarize themselves with these special techniques.

The decisions involved in ice navigation include selecting the maximum speed that the ship may operate without imposing undue stress, and possibly permanent damage, to any section of the ship's structure.

Safe navigation of a ship under ice conditions requires the identification of type, age and thickness of ice in the ship's vicinity and assessment of the corresponding strength of the ice. Based on experience, the ship's officer then performs a mental correlation to determine the maximum speed the ship may operate without exceeding safe stress limits. However, no direct evaluation has heretofore been possible and so corrective action is usually based on indirect means such as engine RPM, speed and structural vibrations.

In reality, the ship's officer is not always able to obtain all the information required to make a decision regarding the safe operation of the ship. Reasons vary from circumstances where poor visibility precludes proper identification of ice conditions to practical considerations that require the navigating officer to perform other functions in addition to navigating the ship through ice.

An officer experienced in navigation with a certain size and class of ice breaking ship is not always able to transfer this expertise to another ship of a different size and structural strength. It can therefore be seen, that the decision of selecting safe operating speed is a subjective matter of judgement on the part of the officer. The optimum speed will be at or close to the highest speed the ship may operate without causing damage to any of the ship's structures or systems. While the more experienced officers will navigate close to this optimum speed, inevitably there will be some officers who exceed safe limits endangering the ship's safety, while there will be other officers who will operate somewhat below safe limits, thereby reducing the operational efficiency of the ship.

The present invention provides a navigating officer with an instantaneous evaluation of the ship's operating conditions. This direct feedback will enable the officer to take corrective action when necessary.

A plurality of strain gauges are attached to the outer plates of the ship's hull. The stress, continuously measured by these gauges, is scanned by a microprocessor and compared with preset levels of stress. The preset levels of stress are determined by the yield strength of the plates to which the strain gauges are attached. The microprocessor produces a three level signal which represents safe, high or dangerous levels of stress on the structure.

In accordance with an aspect of the invention there is provided a scanning device for use with an array of sensors, said scanning device comprising at least one remote data acquisition unit comprising (a) a microprocessor; (b) an analog multiplexer having a plurality of inputs, each input connected in a one-to-one correspondence with a sensor of said array, said microprocessor controlling the sequential scanning of said multiplexer;(c) an analog-to-digital converter connected to an output of said multiplexer for converting analog signals generated by said sensor array into corresponding digital data signals, the output of said analog-to-digital converter being connected to said microprocessor; and (d) a RAM connected to said microprocessor, wherein said microprocessor stores an address identifying a sensor of said array and the magnitude of said digital data signals from said array, and wherein said microprocessor sequentially codes said addresses and said digital data signals in said RAM for transmission on a data bus; a master control unit comprising (a) a master microprocessor, connected to said data bus, wherein said master microprocessor compares said data signals with two predetermined levels for producing first, second and third status signals; and (b) a display means for displaying said first, second and third status signals.

In one embodiment of the invention, a display is provided which represents a schematic diagram of the bow section of a ship having located thereon a plurality of coloured lights. Illumination of the lights indicates that a particular level of stress is being experienced by the structure at the location of the illuminated light on the diagram. In addition, in conjunction with lights representing dangerous levels of stress, there is provided an audible alarm. When the navigating officer observes an increasing number of dangerous levels, he can command a reduction in the speed of the ship until the dangerous levels disappear. A printer is provided which gives a permanent record of all stress levels above predetermined levels. The printout indicates the magnitude of the maximum stress, its physical location within the structure and the time of its occurrence.

The primary function of the present invention is to monitor ice breaking stresses in hull structures. However, the system can be extended for use in tracking forces that may subject the structure to excess structural stress from other than ice encounters. These may be caused by hydrodynamic forces or by loading. The present invention need not necessarily be restricted to an application on ships. Such a system can be used on any structure wherein control over loading takes place. Such an example of an alternate application of the system of the present invention would be its use on a crane.

The present invention will be described with respect to a preferred embodiment with the aid of the accompanying drawings, in which.

Figure 1:
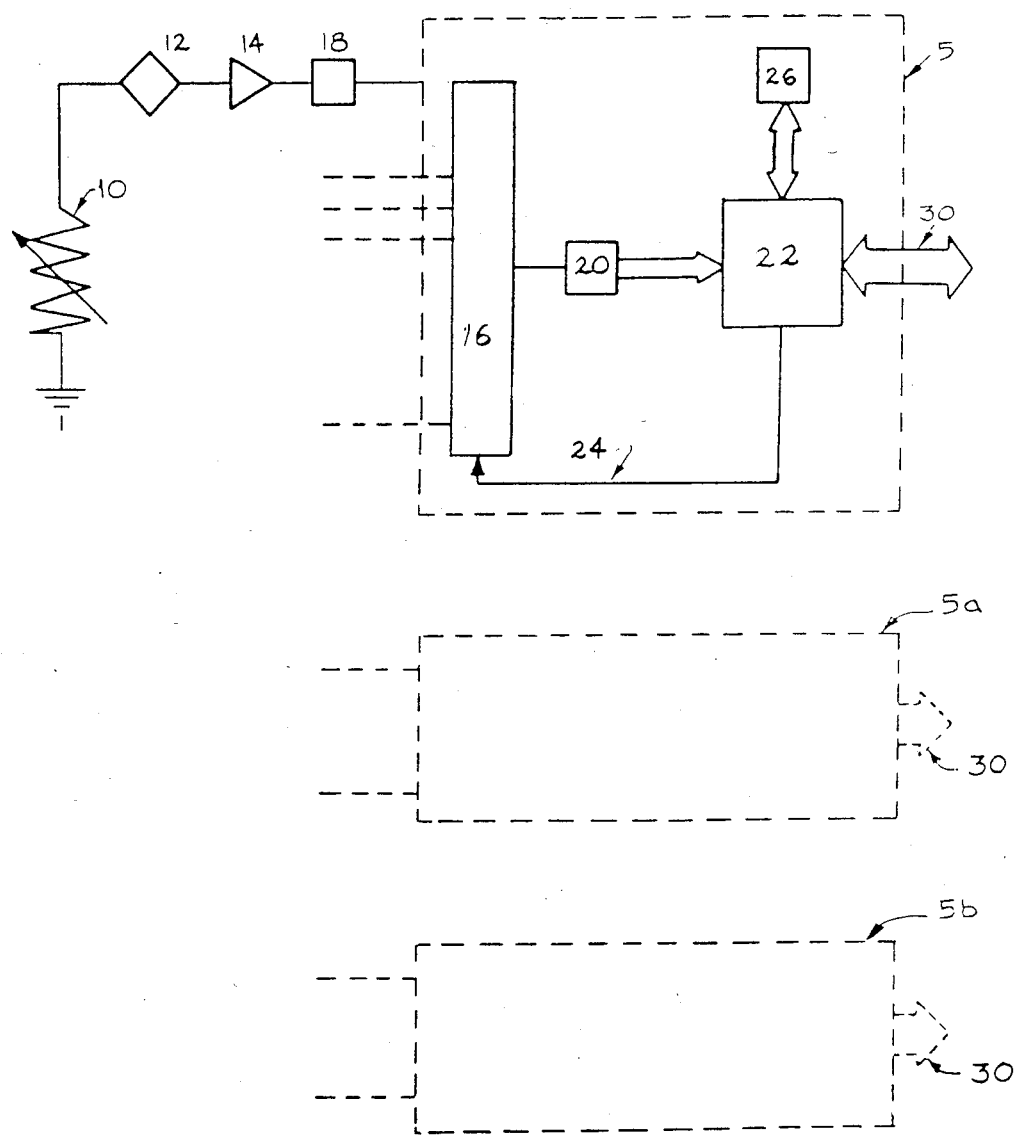
FIG. 1 is a block diagram of remote data acquisition units in accordance with the present invention.

A plurality of strain gauges, one of which is indicated by the variable resistor 10, are attached to various strategic points on the port and starboard sides of a bow structure. The output of the strain gauge 10 is fed to a Wheatstone bridge 12. The output of the bridge provides a signal which is proportional to the stress instantaneously appearing at the point of attachment of the gauge 10 to the hull. This stress signal is amplified by amplifier 14 and feeds one input of multiplexer 16 via a buffer/filter stage 18. The buffer/filter stage 18 prevents loading of the input to the multiplexer and removes noise from the signal, for example, line noise. One multiplexer stage 16 can handle up to 64 strain gauges. Each such strain gauge would be connected via a bridge, amplifier and buffer/filter with an input of the multiplexer 16.

The output of analog multiplexer 16 is fed to an 8 bit analog-to-digital (A/D) converter 20, which sequentially converts the analog signals from each of the strain gauges 10 into an 8 bit digital signal.

The operation of the entire unit identified generally by numeral 5 is under the control of a microprocessor 22. The microprocessor 22 provides sensor address signals on line 24 to multiplexer 16. These signals sequentially increment the multiplexer 16 so that the output of each strain gauge is sequentially fed to the A/D converter 20.

The unit 5 is known as a remote data acquisition unit and is physically located in close proximity to the array of strain gauges. The strain gauges are interconnected to the bridges by cables. These cables must necessarily traverse difficult environmental conditions, and as a result, it is not unusual that stray signals and voltages add to the output of the strain gauge. One such source of unwanted signal are voltages caused by galvanic reactions appearing at dissimilar metallic interfaces. Other examples of stray signals are those caused through variations in temperature and changes in the residual stress of the structure. These unwanted signals tend to be time insensitive and as a result, can be eliminated from the stress signal by subtracting a slowly time varying mean value. Microprocessor 22 generates what is known as a tracking dynamic mean value for each strain gauge. This value is then subtracted from the signal received from each strain gauge to provide a signal proportional to the actual stress caused by the loading of the hull at the location of the strain gauge. Such a dynamic mean value also compensates for residual stress at the point of contact of the strain gauge with the hull. The dynamic mean value can only range to a certain maximum value above which the system is unable to compensate. When such a value is reached for a particular strain gauge, the microprocessor 22 automatically eliminates the strain gauge in question from the array calculations and signals the display that a strain gauge malfunction has taken place.

The address, i.e. the strain gauge in question and its digital stress value, is stored in RAM 26. The microprocessor 22 scans the maximum of 64 strain gauges at a rate of 156 samples per second. As a result, the RAM is continuously being updated by stress values larger than previously stored values, if such larger values occur at a given strain gauge. The system contemplates the possible use of more than one remote data acquisition unit. Such other units are shown in phantom in FIG. 1 and are identified as 5a and 5b. Microprocessor 22 continuously scans the data stored in RAM 26, codes that data and applies it in a sequential manner to data bus 30. The coding of the data for transmission includes the address of the strain gauge, its latest maximum value of stress and a parity bit. Identical microprocessors appearing in remote data acquisition units 5a and 5b provide, upon request, coded data on buses 30a and 30b.

Figure 2:
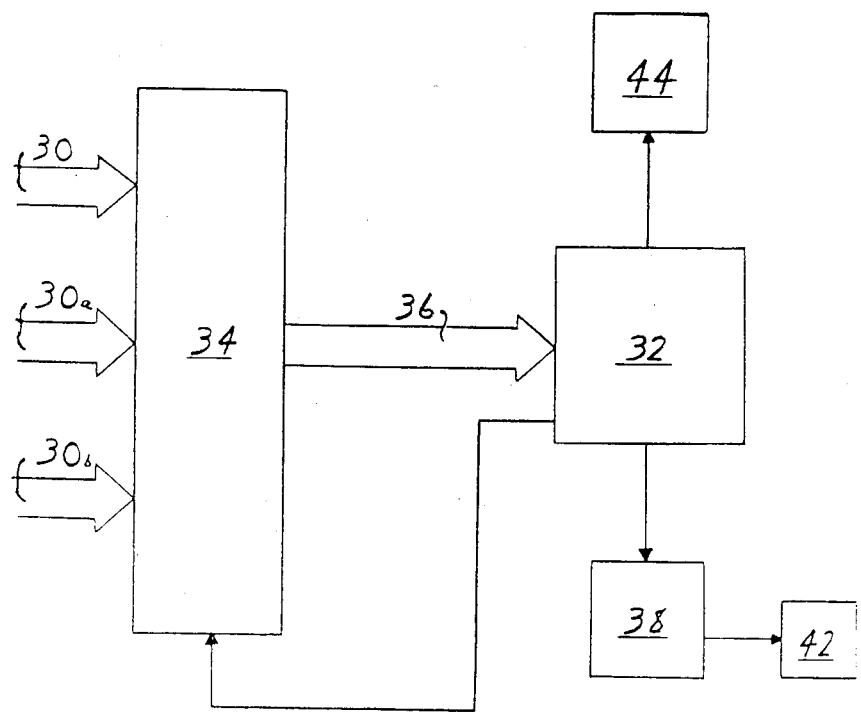
FIG. 2 is a block diagram of a master control unit used in conjunction with the remote data acquisition units of FIG. 1.

FIG. 2 is a block diagram of the master control unit. Buses 30, 30a and 30b shown in FIG. 2 are the same buses shown in FIG. 1. These buses continuously have data impressed thereon from RAM by the microprocessors located at the remote locations.

Master microprocessor 32 provides sensor address signals to digital multiplexer 34. As a result, the buses 30, 30a and 30b are sequentially scanned. The data is fed to master microprocessor 32 via data bus 36. The master microcprocessor 32 checks the data trains arriving on bus 36 for parity. Erroneous data is ignored. Verified data is then compared with two predetermined stress values. The first stress value represents fifty percent of the yield strength of the material to which the particular sensor is connected. The second predetermined stress value represents eighty percent of the yield strength. If the value of the received data for a given sensor falls below fifty percent of the yield strength for that sensor, a signal is sent to display unit 38 which illuminates a GREEN light 40 during the sensor scan period. If the received value of stress falls within fifty to eighty percent of the yield strength for a given sensor, a signal is sent to display 38 which illuminates a YELLOW light at the location of the sensor on the hull. Finally, if the received value of stress falls above eighty percent of the yield strength for a given sensor, a signal is sent to display 38 which illuminates a RED light at the location of the sensor on the hull. Optionally, an audible tone is sounded for a one second period when a RED light signal is present by sending a signal to audible tone generator 42. At the same time, a signal is sent to printer 44 which provides a permanent record of all stress levels above allowable limits. The printout will indicate the magnitude of the maximum stress, its structural location and the time of its occurrence. Once a day, the printer makes a listing of inoperative sensors excluded from the sampling pattern.

Figure 3:
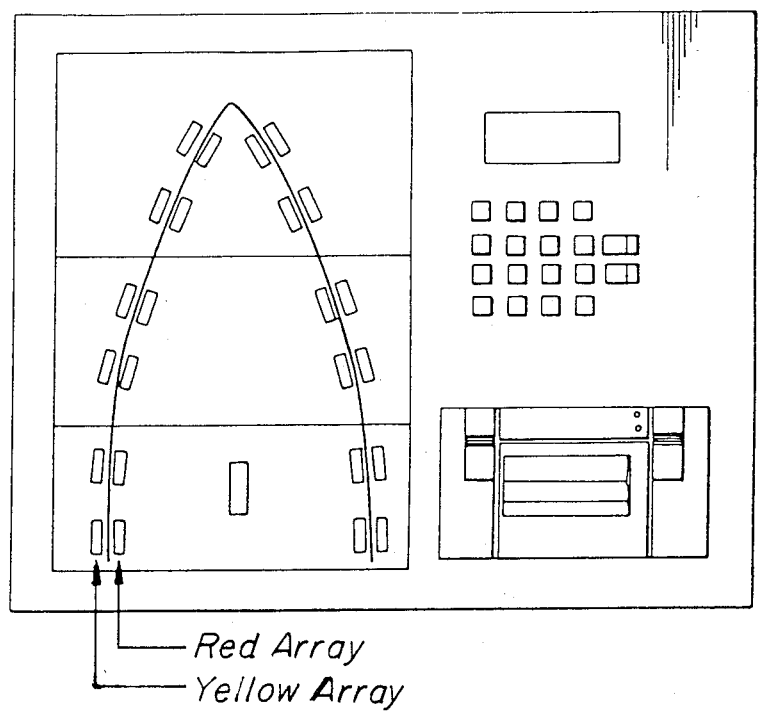
FIG. 3 is a schematic diagram of a particular display unit.

A more detailed drawing of the display 38 is shown in FIG. 3. The hull shape is outlined and the physical location of the various sensors are indicated by a pair of YELLOW and RED lights on the hull. When the received stress for any given sensor is greater than fifty percent of the yield strength, either the RED or YELLOW light at the location of the sensor is illuminated on the display 38. Such illumination takes place for a period of four seconds.

Both the microprocessors 22 and 32 can be Intel 8085 (trade mark), which are commonly available.

We claim:

1. A scanning device for use with an array of sensors, said scanning device comprising:
   A. At least one remote data acquisition unit comprising:
   (a) a microprocessor;
   (b) an analog multiplexer having a plurality of inputs, each input connected in a one-to-one correspondence with a sensor of said array, said microprocessor controlling the sequential scanning of said multiplexer;
   (c) an analog-to-digital converter connected to an output of said multiplexer for converting analog signals generated by said sensor array into corresponding digital data signals, the output of said analog-to-digital converter being connected to said microprocessor; and
   (d) a RAM connected to said microprocessor, wherein said microprocessor stores an address identifying a sensor of said array and the magnitude of said digital data signals from said array, and wherein said microprocessor sequentially codes said addresses and said digital data signals in said RAM for transmission on a data bus;

B. A master control unit comprising:
(a) a master microprocessor, connected to said data bus, wherein said master microprocessor compares said data signals with two predetermined levels for producing first, second and third status signals; and
(b) a display means for displaying said first, second and third status signals.

2. The device according to claim 1 wherein a means is provided to track, store and recognize unwanted changes to sensor outputs and to modify the wanted signal output to compensate and wherein each sensor within said array of sensors is comprised of a strain gauge and a Wheatstone bridge.

3. The device according to claim 2 wherein each sensor is connected to an input of said multiplexer via amplifier means and buffer/filter means.

4. The device according to claim 1 containing at least two remote data acquisition units and wherein said device further includes a digital multiplexer connecting said data bus of each of said at least two remote data acquisition units to said master microprocessor.

5. The device according to claim 4 wherein said master microprocessor controls the scanning rate of said digital multiplexer.

6. The device according to claim 5 wherein said first status signal is generated when said data signal is below said first predetermined level, said first status signal illuminating a first light on said display means.

7. The device according to claim 6 wherein said second status signal is generated when said data signal is between said first and second predetermined levels, said second status signal illuminating at least one light in a first array of lights on said display means, the location of said at least one light in said first array being determined by the location of said sensor.

8. The device according to claim 7 wherein said third status signal is generated when said data signal is greater than said second predetermined level, said third status signal illuminating at least one light in a second array of lights on said display means, the location of said at least one light in said second array being determined by the location of said sensor.

9. The device according to claim 8 further including an audible alarm means connected to said display means and operable in the presence of said third status signal.

10. The device according to claim 9 further including printer means connected to said master microprocessor, said printer means printing the maximum value of stress per scan, the address of the sensor sensing said maximum stress and the time at which said maximum stress occurs.

* * * * *